Figure 1:
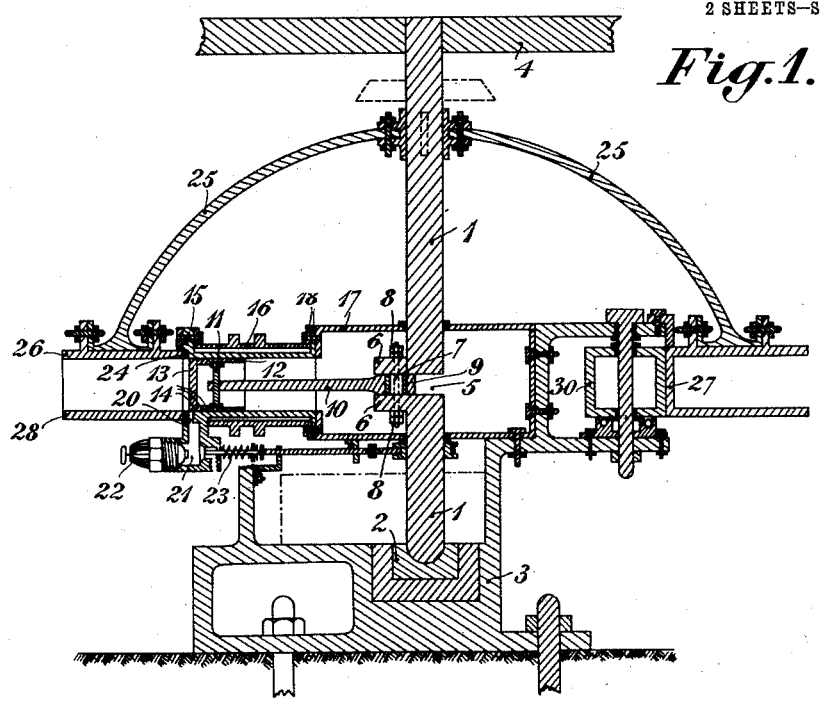

T. C. ANDERSEN.
EXPLOSION TURBINE.
APPLICATION FILED NOV. 25, 1912.

1,099,732.

Patented June 9, 1914.

2 SHEETS—SHEET 1.

WITNESSES:

INVENTOR:
Thomas Christian Andersen
BY
ATTORNEYS:

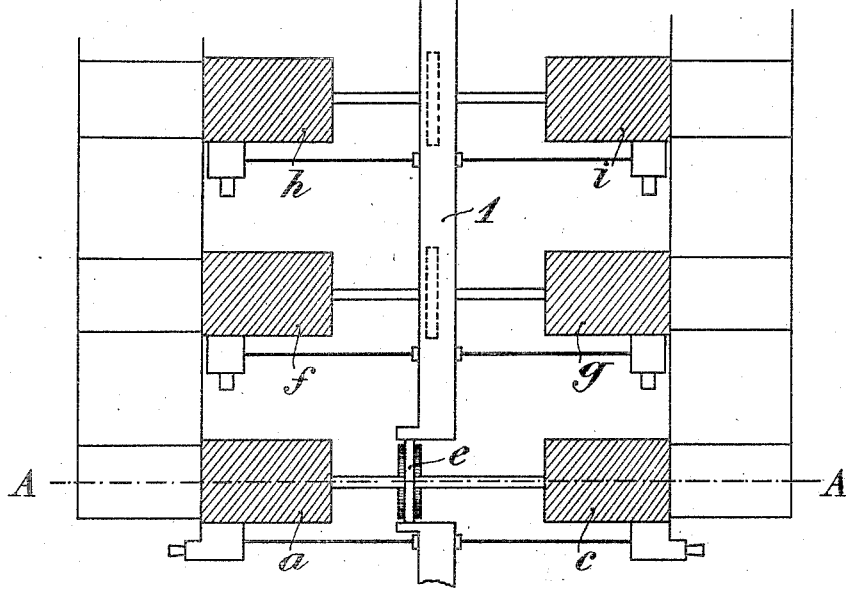
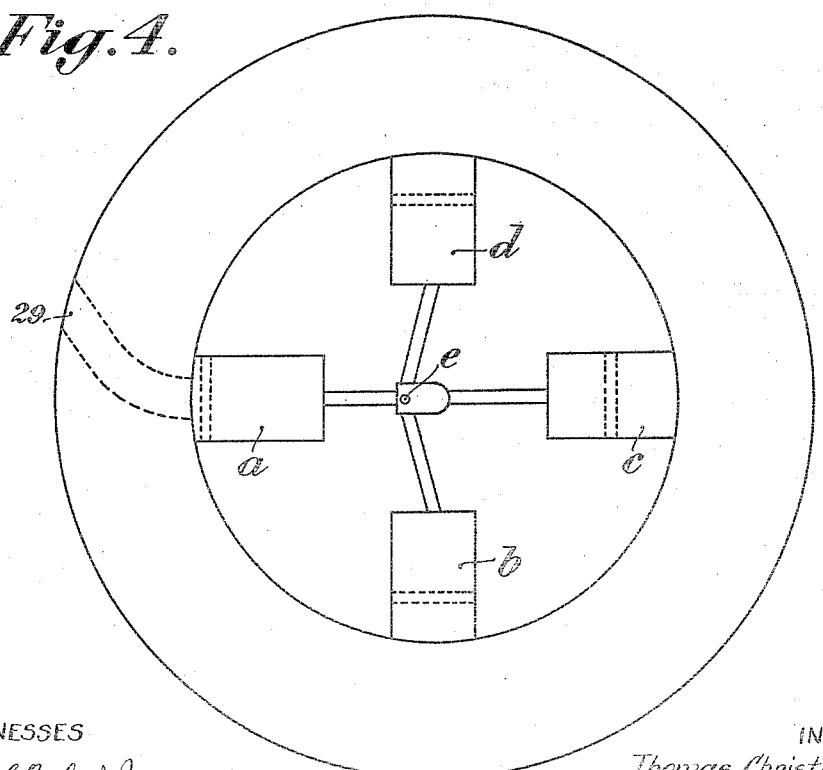

UNITED STATES PATENT OFFICE.

THOMAS CHRISTIAN ANDERSEN, OF VIBORG, DENMARK.

EXPLOSION-TURBINE.

1,099,732.  Specification of Letters Patent.  Patented June 9, 1914.

Application filed November 25, 1912. Serial No. 733,323.

*To all whom it may concern:*

Be it known that I, THOMAS CHRISTIAN ANDERSEN, of Viborg, Province of Jutland, in the Kingdom of Denmark, engineer, have invented certain new and useful Improvements in Explosion-Turbines, of which the following is a specification.

The present invention relates to an explosion turbine, *i. e.* an engine in which the explosive power is transmitted to a rotating part in a similar way to that in which a power of a different kind is transmitted to an ordinary turbine.

Figure 2:
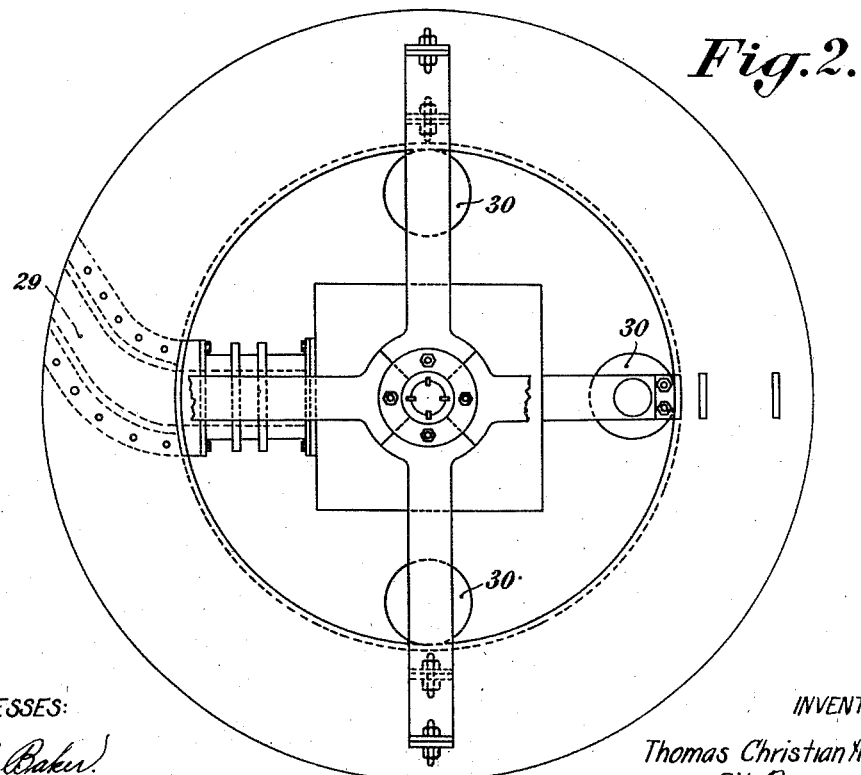

A simple mode of carrying the invention into effect is shown on the drawing, in which:

Figure 1 represents a vertical section of the machine, Fig. 2 a view from above, Fig. 3 represents a chematical view of a machine with several cylinders in vertical section, and, Fig. 4 a horizontal section on line A—A in Fig. 3.

A heavy vertical shaft 1 is provided and mounted at its lower end in a step bearing 2 in a fixed arm 3 and at its upper end in a part 4, also fixed. The shaft 1 is divided at 5 into two parts, each of which carries a crank arm 6. Through these crank arms there passes a polygonal bolt 7 which in combination with a nut 8 holds the two pieces of the shaft 1 together. The bolt 7 is provided between the crank arms with a sleeve 9, around which one end of a piston rod 10 takes. The sleeve 9 can, when worn, be renewed. The piston rod 10 is connected at the other end with a bolt of a piston 12. The latter consists of a turned cylinder which has an inside bore allowing of the movement of the piston rod. The end of the piston is marked 13. Externally the piston carries say three piston rings 14, which form the packing between the piston 12 and a piston chamber or cylinder 15, in which the piston reciprocates. The piston chamber or cylinder 15 is, at a suitable distance, surrounded by a jacket 16 so that between the latter and the piston chamber 15 a space is formed for cooling water. The piston chamber 15 and the jacket 16 are fastened by flanges 18 and bolts 19 to a crank-case 17, which incloses the parts that take part in the movement of the crank and is fixedly secured to the frame 3. The crank case can be divided into two or more pieces in a suitable way.

The piston chamber 15 is connected up by a channel 20 with a special chamber 21, in which an ignition device 22 and a valve 23, *i. e.* the admission valve with spring, are fitted. The valve connects the chamber 21 with a carbureter, which is mounted on the frame 3 together with the pump and the electric ignition device. These parts are, however, not shown on the drawing as they may be of a generally known kind.

On the side away from the shaft 1 the piston chamber 15 is shaped as a cylindrical surface having the same axis as the piston 12. A steel ring 24 is fitted in a groove provided in the edge of the piston chamber and is under the action, say, of springs—which are, however, not shown on the drawing, acting in a direction away from shaft 1. The valve 23 is controlled by springs and also either by rod and eccentric or pinions, according as the explosion is to take place at each piston stroke or every second stroke.

The turbine itself is suspended on the shaft 1 by means of a number of arms 25. The arms are connected above with the shaft and below with the topmost annular plate 26 of the turbine, which plate is connected by a vertical cylindrical annular plate 27 with the lowermost horizontal plate 28, of the same shape as plate 26. The annular plate 27 is provided with a bore, not shown, for the turbine channel. On Fig. 2 a turbine channel 29 provided between the plates 26 and 28 is shown, and its shape is evident from this figure. The turbine itself is controlled by three rollers 30 rotatably mounted in a frame; the bearings for these rollers may be provided with balls. The rotation of the turbine itself in a plane at right angles to shaft 1 can be brought about, for example, by a guide pin or roller fitted to the frame or the front face of the piston chamber. At the upper end of shaft 1 the transmission wheel is fitted directly beneath part 4.

The engine can work, say, with petrol, which is converted into gas in a carbureter and conveyed to the motor through the valve 23. Ignition is produced by an inductor actuated from the main shaft, which at the same time drives the cooling water pump. It may be necessary to cool not only the motor, but also the turbine channel 29, which can be done in any known way.

In the piston chamber 15 the charge of vaporized petrol and air is compressed to about five atmospheres pressure, whereupon the mixture is made to explode, and the combustion gases flow out at the right moment into the turbine channel 29, which channel owing to its shape converts the force into tangential force, which, together with the reaction produced by the explosive substances on leaving the mouth of the channel, and in conjunction also with the piston pressure, if any, form the forces for producing the rotation of the machine. Packing is provided by means of rings 24 or in some other suitable way. The explosive effect can either be imparted immediately to the turbine channel 29 or can act, shortly before discharge, on the piston.

In Figs. 3 and 4 an engine is shown with several cylinders, four in each plane, $a$, $b$, $c$ and $d$ being the four cylinders or piston chambers in the one plane. The four corresponding piston rods are attached to a common crank pin $e$ on the shaft 1. Only one turbine channel 29 is provided for each set of four piston chambers lying in the same plane, said channel receiving four discharges upon each complete revolution. At the moment when the channel 29 is in front of the piston chamber i. e. in the position shown in Fig. 4, a discharge through the channel will just have taken place. In the same piston chamber the suction will commence immediately after the channel has passed. The suction continues until the channel is in front of the piston chamber $c$. and the mixture in the first-mentioned piston chamber $a$ is consequently compressed, while the channel passes from the piston chamber $c$ over $d$ to $a$. Immediately before the channel passes $a$ the compressed mixture is ignited, whereupon the discharge through the channel takes place. The other pistons $b$, $c$ and $d$ work in exactly the same manner, with the result that the turbine channel receives a discharge for each 90° it is turned and four for a complete revolution. The valves may be suitably operated from a common eccentric. Above these four piston chambers another set of, for instance, 4 piston chambers in the same plane is arranged and act upon the same shaft. Fig. 3 shows two of these chambers, $f$ and $g$. Above this set a further set of piston chambers of which two, $h$ and $i$, are shown can be placed etc. The engine works on a two stroke cycle an explosion occurring upon each revolution. The channel 29 can, however, be made so narrow, that when passing a piston chamber it cannot take the whole discharge.

Having now particularly described and ascertained the nature of my said invention and in what manner the same is to be performed, I declare that what I claim is:—

1. An explosion turbine comprising a rotating part, a stationary inner part surrounded by said rotating part and containing piston chambers open at their ends, an axial shaft for said rotating part, pistons for said piston chambers and actuated from said shaft, the said rotating part forming the end wall of the piston chambers and having one exhaust turbine channel 29 for the piston chambers lying in the same horizontal plane, and a suitable packing interposed between the rotating part and the piston chambers.

2. An explosion turbine comprising a rotating part having an axial shaft, a stationary inner part surrounded by said rotating part, piston chambers contained in said stationary part and having open ends, pistons in the said piston chambers and actuated from the shaft of the rotating part, the said rotating part having a single exhaust channel for the piston chambers lying in the same horizontal plane, the said rotating part forming the end wall of the piston chambers and closing the same, and suitable packing interposed between the rotating part and the ends of the piston chambers.

3. An explosion turbine comprising a rotating part, mounted to turn in a horizontal plane, a vertical shaft for the same, a stationary part surrounded by the rotating part, piston chambers in said stationary part, arranged in a horizontal plane, the said piston chambers having open ends, pistons in said chambers and having piston rods, the shaft of the rotating part having a common crank pin for said piston rods, the outer open end of the piston chambers being closed by the rotating part, and means for admitting an explosive mixture to the piston chambers, the said rotating part having one exhaust channel for the piston chambers lying in the same horizontal plane.

4. In an explosion turbine, a stationary part containing a horizontally arranged piston chamber having its outer end open throughout the area of the bore of the cylinder and curved on the arc of a circle, an annular member rotating in a horizontal plane and surrounding the stationary part the said rotating member being adapted to close the open end of the piston chamber, and forming the outer end wall of said chamber, the said rotating member having a single exhaust channel adapted to communicate with said open end of the piston chamber, a vertical shaft for said rotating member, and a piston in said piston chamber and actuated from the shaft of the rotating member.

In testimony, that I claim the foregoing as my invention I have signed my name in presence of two subscribing witnesses.

THOMAS CHRISTIAN ANDERSEN.

Witnesses:
ERNEST BOUTARD,
HJALMAR BOUTARD.